FIG. I

INVENTOR.
J. J. HENNEN

Dec. 12, 1967     J. J. HENNEN     3,357,164
FORAGE HARVESTER

Filed May 12, 1965     2 Sheets-Sheet 2

INVENTOR.
J. J. HENNEN

United States Patent Office 3,357,164
Patented Dec. 12, 1967

3,357,164
FORAGE HARVESTER
John J. Hennen, Ottumwa, Iowa, assignor to Deere & Company, Moline, Ill., a corporation of Delaware
Filed May 12, 1965, Ser. No. 455,213
5 Claims. (Cl. 56—16)

ABSTRACT OF THE DISCLOSURE

A pull-type forage harvester having a row crop harvesting header for removing the crop from the field and feeding the crop to an axially transverse cylinder type cutterhead mounted in a generally cylindrical housing having an outlet with an associated tangential discharge spout through which the reduced crop is impelled, and an arcuate plate-like grate removably mounted over the outlet concentric with the cutterhead axis and having vertically elongated apertures side by side across its width through which the crop is discharged.

This invention relates to an agricultural crop-handling machine and more particularly to a forage harvester or the like having a grate associated with a rotary type cutter for reducing the crop.

A typical forage harvester collects the crop from the field, reduces the crop by means of a rotary cutter, and delivers the commuted crop to a receptacle, conventionally a trailing wagon. In certain machines of this type, the rotary cutter also functions as an impeller for delivery of the reduced crop to the trailing wagon. In some circumstances, it has been found desirable to discharge the reduced crop through a screen to further reduce the crop, since a finer cut presents less difficulty in subsequent handling of the crop and is more palatable to livestock. However, such screens have impaired the efficiency of the cutterhead as a discharge impeller, and it has been necessary to add an elevator means, conventionally a blower type elevator, for delivery of the reduced crop to the receptacle. This, of course, substantially increases the size and cost of the machine.

According to the present invention, the reduced crop is forced through a grate, which further reduces the crop but does not destroy the efficiency of the rotary cutter as a discharge impeller. Although such a grate does not provide as fine a cut as a screen with relatively small apertures, it does afford acceptable reduction and eliminates the necessity for additional conveyors or elevators, and is especially advantageous for use on smaller, less expensive machines.

Another object of the invention is to provide an easily removable or replaceable grate for optional use of the grate.

Still another object is to provide a compact grate, simple and inexpensive to manufacture and maintain, and which can be installed as original equipment or added to a machine already in the field.

These and other objects will become apparent from a consideration of the following detailed description and accompanying drawings wherein the preferred embodiment of the invention is illustrated.

Figure 1:
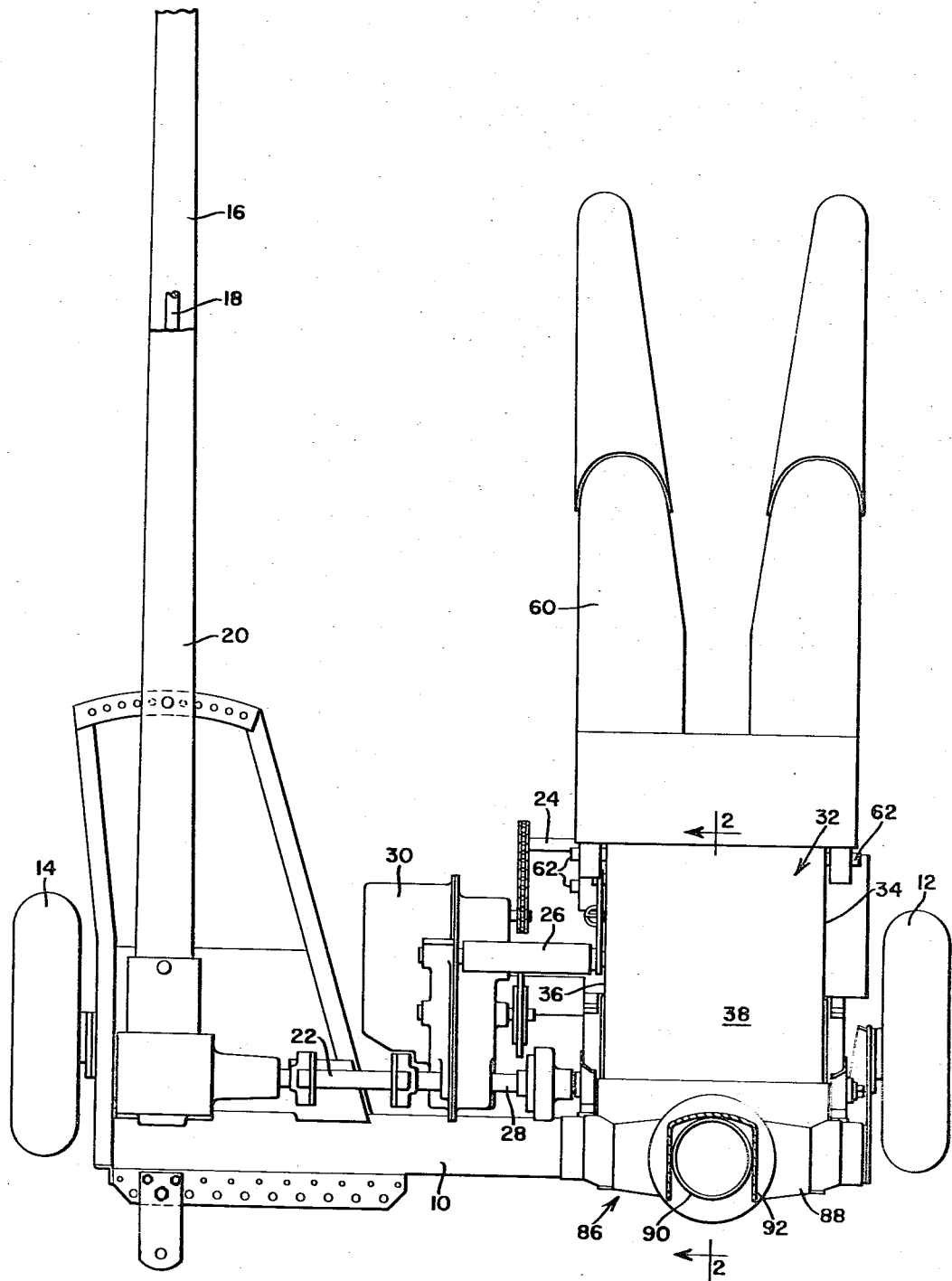
FIG. 1 is a plan view of the forage harvester, partly in section.

In the ensuing description, it is to be understood that such terms as "forward," "rear," "upwardly," "vertical," "horizontal," etc., are words of convenience and are not to be construed as limiting the orientation or geography of the components.

The forage harvester illustrated has a mobile frame 10 supported on right and left wheels 12 and 14 and connectible to a tractor (not shown) by a forwardly extending draft member 16 above which is a fore-and-aft drive shaft 18, partly shielded by a shield 20 and conventionally connectible at its forward end to a tractor power take-off (not shown) and connected at its rear end to a transverse drive shaft 22, which rotates an attachment drive 24, a feed roll drive 26, and a cutterhead drive shaft 28 via a transmission 30.

A cutter housing 32 is mounted on the frame and includes opposite upright sides 34 and 36, a top portion 38, and an arcuate bottom member 40 extending between the sides 34 and 36 and having transverse forward and rear edges 42 and 44. A forward member 46 depends from the top portion 38 between the sides 34 and 36 and has a lower edge 48 spaced above the forward edge 42 of the bottom member 40 to form a forward inlet opening 50. A rear member 52 also depends from the top portion 38 between the sides 34 and 36 and has a lower edge 54 spaced forwardly and upwardly from the rear edge 44 of the bottom member 40 to form a transversely elongated rear outlet opening 56. Thus, the cutter housing 32 is substantially closed except for the inlet opening 50 and outlet opening 56.

A harvesting means 60, here shown as a row unit, is detachably mounted on a plurality of attachment points 62 carried by the frame 10. Other types of harvesting means, having the same attachment points, may be substituted for the unit shown. The harvesting means 60 collects the crop from the field and moves it rearwardly to a plurality of associated feed rolls 64, which feed the crop rearwardly through the cutter housing inlet opening 50, over a transverse stationary knife 66, and into a cylinder type cutterhead 68 rotatably mounted within the cutter housing 32.

The cutterhead 68 includes a transverse shaft 70, coaxially joined to and rotated by the cutterhead drive shaft 28 in the direction of the arrow 71, a plurality of radial members 72 mounted on the shaft 70, and a plurality of knives 74 mounted on the radial members via a plurality of knife holders 76 and extending in a generally longitudinal direction on the cutterhead periphery, the knives 74 cooperating with the stationary knife 66 to cut the crop and imparting an angular velocity to the reduced crop. The rotationally advanced side of each knife is concave to facilitate the acceleration of the crop. While the knives 74 are shown as substantially straight knives, helically extending knives could also be utilized on the cutterhead periphery in the conventional manner.

An arcuate grate 78 is removably mounted over the outlet opening 56, substantially concentrically adjacent to the cutterhead 68 and is attached at opposite ends by means of fasteners 82 to arcuate key strips 80 affixed to the housing sides 34 and 36. The grate 78 has a plurality of elongated, parallel, radial slots or apertures 84 closely spaced side by side across the width of the grate between the sides 34 and 36 and thus substantially coextensive with the axial length of the knives 74. The apertures are preferably elongated in a transverse direction relative to the knives and are thus vertically elongated when straight knives 74 are used and slightly canted from the vertical when helical knives are used.

An upwardly directed discharge spout 86 is mounted on the housing 32 over the outlet opening 56 and has a transversely elongated lower portion 88 forming an inlet 89 coextensive with the outlet opening 56. The lower portion 88 tapers upwardly to an approximately cylindrical intermediate portion 90, which carries an arcuate upper portion 92, shown in section in FIG. 1. The upper portion is conventionally swingable about a vertical axis to vary the direction of discharge. The rear side of the lower portion 88 includes a door 94 hinged at 95 and releasably held closed by latches 96. The door is normally closed but may be opened for access to the grate 78 and cutterhead 68.

Figure 2:
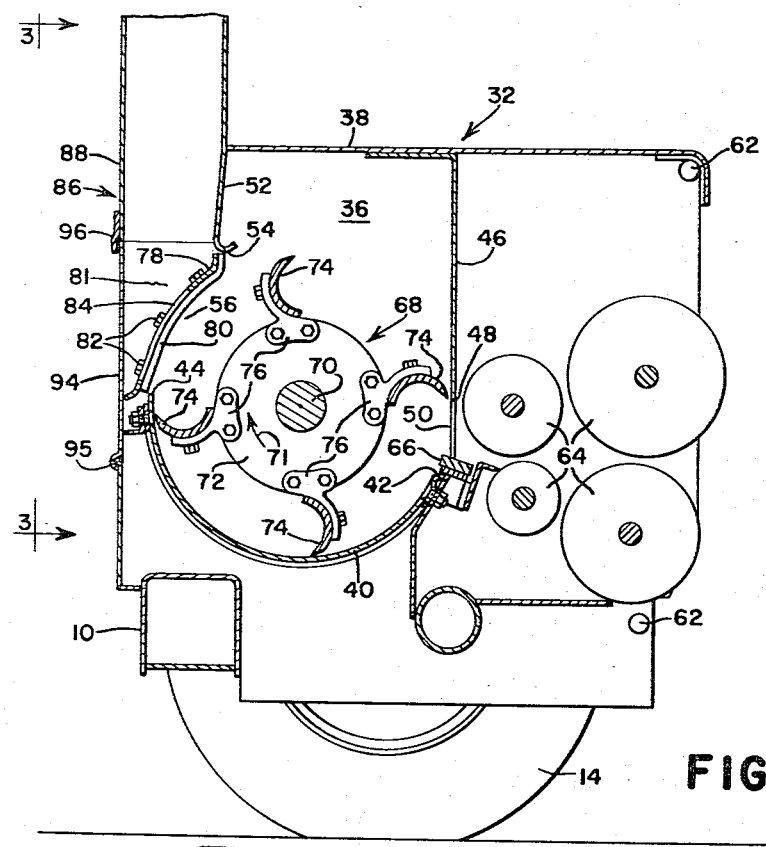
FIG. 2 is an enlarged partly schematic section along the line 2—2 of FIG. 1.
Figure 3:
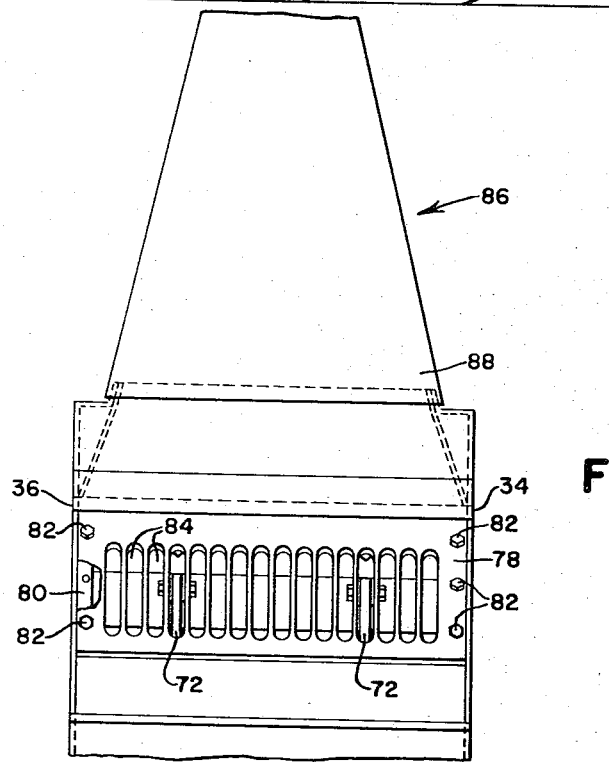
FIG. 3 is a partial rear view of the machine, with the housing access door removed, as viewed along the line 3—3 of FIG. 2.

In operation, the crop is collected from the field by the harvesting means 60 and fed rearwardly through the cutter housing inlet 50 by the feed rolls 64. The crop is then reduced by the cutterhead, rotating in the direction of the arrow 71 in FIG. 2, and impelled tangentially through the outlet opening 56 for discharge through the discharge spout 86. When the grate 78 is installed over the outlet opening, most relatively long sections of the crop will strike the grate 78 and will be further reduced by impact with the grate or recirculated for further reduction by the cutterhead. The grate 78 is preferably mounted closely adjacent to the cutterhead 68 to prevent a buildup of material on the grate, the cutterhead 68 forcing the crop through the grate or recirculating the crop. Since the apertures are vertically elongated and the bars between apertures are narrow, the grate does not interfere with the tangential movement of the reduced crop through the outlet to the extent that the momentum of the crop is no longer sufficient to carry it through the discharge spout. The arc of the grate 78, and consequently the length of the apertures 84, is limited by the size of the outlet opening 56, the grate 78 in the preferred embodiment having an approximately 60° arc and the apertures 84 extending in an approximately 40° arc relative to the cutterhead axis. The grate is removed for optional operation without the grate or for access to the cutterhead 68 by opening the access door 94, removing the fasteners 82, and removing the grate through the access door.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a harvester having a mobile frame adapted to advance over a field, a cutter housing on the frame and having an outlet and an inlet, means on the frame for moving the crop from the field through said inlet, and a cylinder type rotary cutter means in the housing for reducing and accelerating the crop in the housing, the combination therewith of an arcuate, plate-like grate mounted over the housing outlet coaxial with the cutter means and having a plurality of apertures elongated in a transverse direction relative to the axis of rotation of the cutter means and through which the accelerated crop is impelled by the cutter means.

2. In a harvester having a mobile frame adapted to advance over a field, a cutter housing on the frame and having an outlet and an inlet, means on the frame for moving the crop from the field through said inlet, a rotary cutter means rotatable within the housing about a transverse axis for reducing the crop in the housing, and a generally tangential and upwardly extending discharge spout communicating with said outlet for receiving and discharging the reduced crop impelled through the outlet by the cutter means, the combination therewith of a grate removably mounted on said housing between the cutter means and the discharge spout and having a plurality of generally vertically elongated slots through which the cutter means impels the crop before it moves through the discharge spout.

3. In a harvester having a mobile frame adapted to advance over a field, a cutter housing on the frame and having an outlet and an inlet, means on the frame for moving the crop from the field and through said inlet, and an axially horizontal cylinder type rotary cutter means having a plurality of knives with elongated edges on its outer periphery and rotatable about its axis within said housing, said knife edges tracing a cylinder as the cutter means rotates, the cutter means reducing the crop after it enters the housing and tangentially impelling the reduced crop through the outlet, the combination therewith of a plate-like grate removably mounted over and covering said outlet and having a plurality of apertures through which the reduced crop is impelled, said apertures being elongated in a direction transverse to the knife edges and disposed in a side-by-side, closely adjacent relationship across the width of the grate.

4. In a harvester having a mobile frame adapted to advance over a field, a cutter housing mounted on the frame and having an outlet and an inlet, means on the frame for moving the crop from the field and through said inlet, an axially horizontal cylinder type rotary cutter means having a plurality of knives on its outer periphery and rotatable about its axis within said housing for reducing the crop after it enters the housing and for tangentially impelling the crop through the outlet, the combination therewith of an arcuate grate mounted on the cutter housing coaxial with and adjacent to the cutter means, between the cutter means and said cutter housing outlet, and having plurality of elongated, radial, parallel apertures, side by side between the radial ends of the grate, the length of each aperture being transverse to the cutter axis.

5. In a harvester having a mobile frame adapted to advance over a field, a cutter housing on the frame and having an inlet, means on the frame for moving the crop from the field through said inlet, an axially horizontal cylinder type rotary cutter means having a plurality of of longitudinal knives on its outer periphery and rotatably mounted within said housing for reducing and accelerating the crop, said housing having an upwardly tangentially directed outlet relative to said cutter means for discharge of the reduced crop, the combination therewith of an arcuate grate, removably mounted over said housing outlet substantially coaxially with and adjacent to the periphery of the cutting means, and having a plurality of elongated, parallel, radial apertures, closely spaced side by side, coextensive with the axial length of said knives and through which the reduced crop is impelled for discharge, the length of each aperture being substantially transverse to the length of said knives.

References Cited

UNITED STATES PATENTS

| 1,645,770 | 10/1927 | Olson | 146—117 |
| 2,659,188 | 11/1953 | Haban | 56—24 |
| 3,127,723 | 4/1964 | Procter et al. | 56—16 |

ANTONIO F. GUIDA, *Primary Examiner.*

ABRAHAM G. STONE, *Examiner.*